United States Patent
Brock et al.

(10) Patent No.: US 6,839,413 B1
(45) Date of Patent: Jan. 4, 2005

(54) METHOD AND SYSTEM FOR DATA COMMUNICATION

(75) Inventors: John Christopher Brock, Union City, CA (US); Ronald Lee Franzen, Austin, TX (US); Michael Stephen Safly, Palo Alto, CA (US); Tod Walton Hays, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/510,606

(22) Filed: Feb. 22, 2000

(51) Int. Cl.[7] .......................................... H04M 11/00
(52) U.S. Cl. ............................. 379/93.08; 379/93.32; 370/466; 709/247
(58) Field of Search .......................... 379/93.01, 93.08, 379/93.31–93.33; 358/426; 370/260–261, 352–353, 493–496, 498, 392, 466; 375/222, 225, 231; 709/203–204, 228, 245, 247

(56) References Cited

U.S. PATENT DOCUMENTS

| | | | | |
|---|---|---|---|---|
| 5,384,780 A | | 1/1995 | Lomp et al. | 370/94.1 |
| 5,546,395 A | | 8/1996 | Sharma et al. | 370/84 |
| 5,557,749 A | | 9/1996 | Norris | 395/200.18 |
| 5,742,773 A | * | 4/1998 | Blomfield-Brown et al. | 709/228 |
| 5,818,603 A | * | 10/1998 | Motoyama | 358/296 |
| 5,850,526 A | * | 12/1998 | Chou | 709/247 |
| 5,931,928 A | | 8/1999 | Brennan et al. | 710/68 |
| 5,956,490 A | * | 9/1999 | Buchholz et al. | 709/245 |
| 6,128,505 A | | 10/2000 | Sipilä | 455/465 |
| 6,266,348 B1 | * | 7/2001 | Gross et al. | 370/493 |
| 6,356,766 B1 | | 3/2002 | Sipilä | 455/465 |
| 6,445,716 B1 | * | 9/2002 | Favichia et al. | 370/466 |
| 6,445,733 B1 | * | 9/2002 | Zuranski et al. | 375/231 |
| 6,542,504 B1 | * | 4/2003 | Mahler et al. | 370/392 |
| 6,570,869 B1 | * | 5/2003 | Shankar et al. | 370/352 |

* cited by examiner

*Primary Examiner*—George Eng
(74) *Attorney, Agent, or Firm*—Baker Botts L.L.P.

(57) ABSTRACT

According to one embodiment of the present invention, a system (10) for data communication disclosed that comprises a first transceiver unit (20), a second transceiver unit (22), and a communication path (34) coupled to the first transceiver unit (20) and the second transceiver unit (22). The first transceiver unit (20) is operable to perform compression negotiation with a second transceiver unit (22). More specifically, the first and second transceiver units (20 and 22) may comprise ADSL transceiver units, and the communication path (34) may comprise a twisted-pair cable. According to one embodiment of the present invention, a method for data communication is disclosed. First, a first transceiver unit (20) and a second transceiver unit (22) are initialized. The first transceiver (20) then communicates a request for compression negotiation to the second transceiver unit (22). A common compression protocol is then identified. Finally, the first transceiver unit (20) transmits data compressed using the common compression protocol to the second transceiver unit (22).

52 Claims, 1 Drawing Sheet

METHOD AND SYSTEM FOR DATA COMMUNICATION

TECHNICAL FIELD OF THE INVENTION

This invention relates generally to the field of data processing and more specifically to a method and system for data communication.

BACKGROUND OF THE INVENTION

New systems and applications that require data communication need increasingly greater bandwidth and higher rates of transmission. Data compression is one approach to providing these improvements. Data compression reduces data storage space and necessary transmission bandwidth by using a compression protocol to eliminate unnecessary or redundant information. Compressed data makes available more bandwidth and can be transmitted more quickly. Data is decompressed after transmission using the same compression protocol to ensure accuracy of the transmission. Known methods of data compression, however, have not included highly compressible control information in the compressed data.

Data moves from one computer system to another by moving "down" through a series of layers in the first system, through a network medium, and "up" through a corresponding series of layers in the second system. The Open Systems Interconnection (OSI) reference model defines seven layers of a computer system. The upper three layers, the application, presentation, and session layers, handle application issues and are generally implemented only in software. The lower four layers, the transport, network, data link, and physical layers, handle data transport issues and are generally implemented in both hardware and software. Control information, which typically takes the form of a header, directs how data moves from one computer system to another computer system. Each layer of the first computer system adds control information to data passed down from upper layers. For example, an upper layer prepends control information to data. The resulting information unit, containing control information and data, is passed down to a lower layer. The lower layer treats the whole information unit as data, and prepends its own control information. The information unit grows as each layer prepends its own control information. Additionally, each layer of the second computer system removes control information from data passed up from lower layers. For example, a lower layer in the second system receives the information unit and retrieves the control information prepended by the corresponding layer in the first system. The control information is removed, and the remainder of the information unit is passed to an upper layer.

Control information is generally highly compressible because it often contains repeated characters. The control information of a lower layer, however, cannot be compressed by an upper layer, because the information of the lower layer is not available at the upper layer. Moreover, the lower layer needs to be able to identify a common compression protocol that the first system can use to compress the data and the second system can use to decompress the data, to ensure accurate data transmission. Known methods and systems of data communication, however, have not been completely satisfactory in providing a system and method for conducting lower layer compression and for identifying a common compression protocol. Therefore, a need has arisen for a new method and system for data communication.

SUMMARY OF THE INVENTION

In accordance with the present invention, a method and system for data communication are provided that substantially eliminate or reduce the disadvantages and problems associated with previously developed systems and methods.

According to one embodiment of the present invention, a system for data communication is disclosed that comprises a first transceiver unit, a second transceiver unit, and a communication path coupled to the first transceiver unit and the second transceiver unit. The first transceiver unit is operable to perform compression negotiation with the second transceiver unit. More specifically, the first and second transceiver units may comprise ADSL transceiver units, and the communication path may comprise a twisted-pair cable.

According to one embodiment of the present invention, a method for data communication is disclosed. First, a first transceiver unit and a second transceiver unit are initialized. The first transceiver unit then communicates a request for compression negotiation to the second transceiver unit. A common compression protocol is then identified. Finally, the first transceiver unit transmits data compressed using the common compression protocol to the second transceiver unit.

A technical advantage of the present invention is that it allows for compression of highly-compressible control information at the lower layers of a computer system, resulting in more available bandwidth and a higher rate of transmission. Another technical advantage of the present invention is it identifies a common compression protocol. By identifying a common protocol, the present invention ensures that the compressed data may be properly decompressed at the other end of the connection, resulting in accurate data communication.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
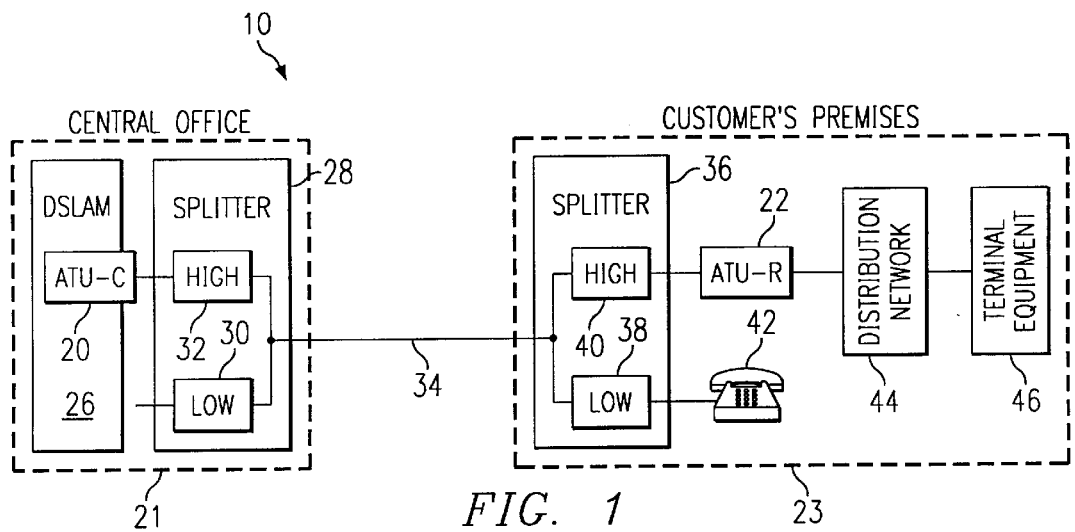
FIG. 1 is a block diagram of a data communication system that may be used in accordance with one embodiment of the present invention.

FIG. 1 is a block diagram of a data communication system 10 that may be used in accordance with one embodiment of the present invention. Referring to FIG. 1, the system 10 comprises a first transceiver unit 20 operable to perform compression negotiation with a second transceiver unit 22. The first transceiver unit 20 may comprise, for example, an asymmetric digital subscriber line (ADSL) transceiver unit. The ADSL transceiver unit (ATU) may be located at a central office 21. The ATU located at the central office 21 (ATU-C) may provide basic switching services for a communication system. The second transceiver unit 22 may comprise, for example, an ATU 22 located at a customer's premises 23. The ATU 22 located at the customer's premises (ATU-R) may comprise, for example, a modem. The message packets that implement the compression negotiation that will be described here may be transmitted through, for example, an ADSL overhead control (AOC) channel, an embedded operations channel (EOC), in-band over the ADSL link itself, or out-of-band in an alternative control or management channel. One embodiment of the present invention allows for data compression negotiation between systems that are communicating using the ANSI T1.413-

1998 American National Standard for Telecommunications. In this embodiment, compression negotiation may take place in a block of AOC header values ("1100xxxx") set aside for vendor specific AOC messages. Alternatively, the EOC may be used for communication between an ATU-C and an ATU-R. The EOC may be used for in-service and out-of-service maintenance and for the retrieval of a limited amount of ATU-R status information and ADSL performance monitoring parameters. In an embodiment using the ANSI American National Standard for Telecommunications, compression negotiation may take place using four EOC operation codes that have been reserved for vendor proprietary use. Other embodiments may also have channels where compression negotiation may take place.

The first transceiver unit 20 may compose part of a digital subscriber line (DSL) interface device at the central office and may be integrated into a DSL access multiplexer (DSLAM) 26. The first transceiver unit 20 may be coupled to a first splitter 28. The first splitter 28 separates a low frequency analog voice channel 30 from a high frequency digital data channel 32, to which the first transceiver unit 20 may be coupled. The first splitter 28 may be coupled to a communication path 34. The communication path 34 may comprise, for example, a twisted pair, which is a pair of individually insulated electrically-conductive wires twisted together. Other suitable embodiments of communication paths 34 include coaxial cables, fiber optic cables, and radio waves. The communication path 34 may be coupled to a second splitter 36 located at the customer premises. The second splitter 36 serves a similar purpose as that of the first splitter 28, that is, separating a low frequency analog voice channel 38 from a high frequency digital data channel 40. The low frequency channel 38 may be coupled to, for example, a telephone 42. The high frequency channel 40 may be coupled to the second transceiver unit 22. The second transceiver unit 22 may be coupled to a premises distribution network 44. The premises distribution network 44 may be, in turn, coupled to terminal equipment 46.

The first transceiver unit 20 and the second transceiver unit 22 may communicate with each other in the following manner. The first transceiver unit 20 sends data to the high frequency band 32 of the first splitter 28. The first splitter 28 then sends the data through the communication path 34 to the second splitter 36, which separates the information into the high frequency band 40 and the low frequency band 38. The high frequency band 40 sends the data to the second transceiver unit 22. The second transceiver unit 22 sends data to the first transceiver unit 20 by reversing the foregoing steps, that is, the second transceiver unit 22 sends data to the second splitter 36, which sends the data through the communication path 34 to the first splitter 28, which sends the data to the first transceiver unit 20.

Figure 2:
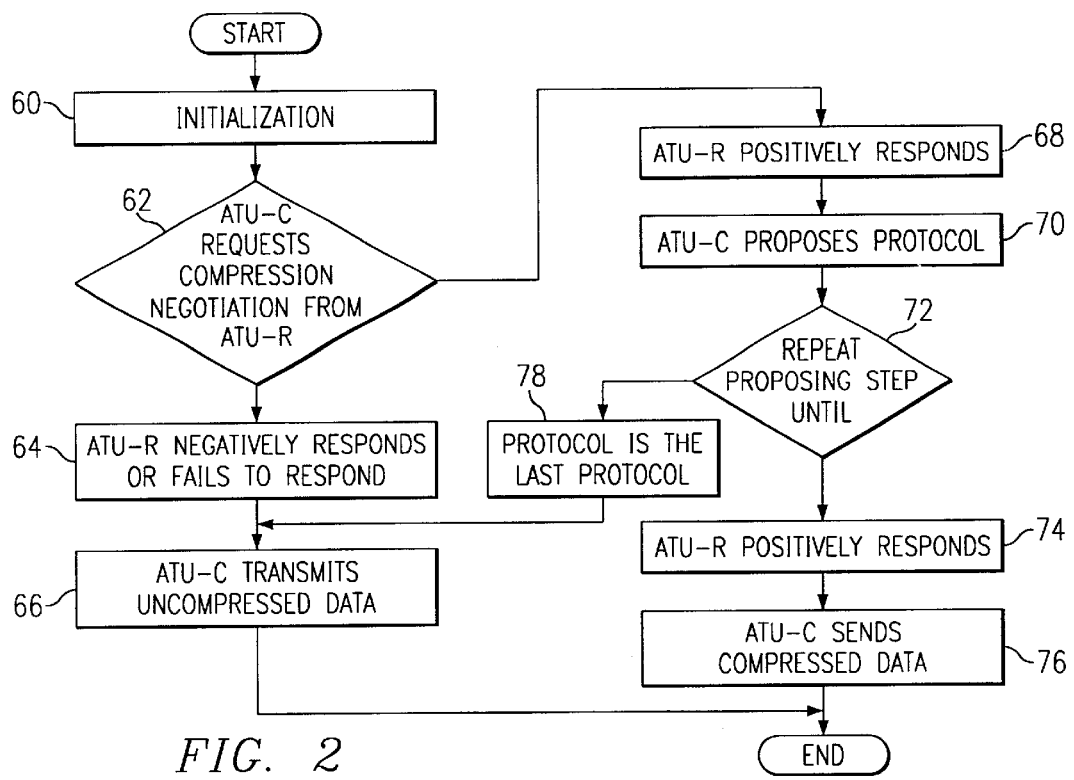
FIG. 2 is a flowchart demonstrating one method of data communication in accordance with the present invention.

FIG. 2 is a flowchart demonstrating one method of data communication in accordance with the present invention. The method shown in FIG. 2 may be used to conduct compression negotiation and data communication between a first transceiver unit 20, for example, an ATU-C, and a second transceiver unit 22, for example, an ATU-R. In general, the first transceiver unit 20 requests compression negotiation from the second transceiver unit 22, then the transceiver units 20 and 22 identify a common compression protocol, and finally the first transceiver unit 20 sends data to the second transceiver unit 22 compressed using the common compression protocol. The method shown in FIG. 2 may also be used to conduct compression negotiation and data communication between the second transceiver unit 22 and the first transceiver unit 20, and may identify a different compression protocol than that identified for compression negotiation from the first transceiver unit 20 to the second transceiver unit 22.

Referring to FIG. 2, the method begins with step 60, where the ATU-C and the ATU-R are initialized in order to conduct data communication between them. During initialization, the ATU-C and the ATU-R determine certain relevant attributes of the connection and establish transmission and processing characteristics suitable to that connection. The ATU-C and the ATU-R conduct initiation layer by layer, starting with the lower layers. In step 62, the ATU-C requests compression negotiation from the ATU-R. If the ATU-R negatively responds or fails to respond within a specified time limit, as shown in step 64, the method proceeds to step 66, where the ATU-C transmits uncompressed data to the ATU-R, and the method terminates. If the ATU-R positively responds, as shown in step 68, the method proceeds to step 70. In steps 70, 72, and 74, the ATU-C and ATU-R attempt to identify a common compression protocol. In step 70, the ATU-C proposes a first compression protocol. This may be a protocol from a list of one or more compression protocols. The list of protocols may be ordered such that the most commonly used protocol is the first item on the list and the least frequently used protocol is the last item on the list. By ordering the list in this manner, a common protocol might be more quickly identified. Alternatively, the protocols may be listed in order of effectiveness, so that the most effective protocol is the first item on the list and the least effective protocol is the last item on the list. By ordering the list in this manner, a relatively effective common protocol might be identified. As shown in step 72, the method repeats the proposing step, step 70, until one of two things happens. If the ATU-R positively responds, as shown in step 74, then a common compression protocol has been identified. The method proceeds to step 76, where the ATU-C sends data to the ATU-R compressed using the common compression protocol, and the method terminates. If the ATU-C runs out of protocols to propose, as shown in step 78, the method proceeds to step 66, where the ATU-C transmits uncompressed data to the ATU-R, and the method terminates.

The present invention identifies a common compression protocol that allows for data compression of control information at the lower layers of the OSI reference model, layers at which data compression was not available with known methods. Since control information is highly compressible, the present invention provides a highly effective approach for gaining more available bandwidth and a faster rate of transmission.

Although an embodiment of the invention and its advantages are described in detail, a person skilled in the art could make various alternations, additions, and omissions without departing from the spirit and scope of the present invention as defined by the appended claims.

What is claimed is:

1. A system for data communication, the system comprising:
   a. a first transceiver unit;
   b. a second transceiver unit; and
   c. a communication path coupled to the first transceiver unit and to the second transceiver unit, the first transceiver unit operable to perform compression negotiation with the second transceiver unit in order to identify a data compression protocol useable by both the first and second transceiver units to conduct data communications comprising compressed data, wherein the compressed data comprises control information associated with an upper communication layer and compressed control information associated with a lower communication layer, the data compression protocol identified by:
  accessing a list identifying one or more compression protocols;
  proposing a compression protocol from the list to the second transceiver unit; and
  repeating proposing a compression protocol until the second transceiver unit communicates a positive acknowledgement, the positive acknowledgement identifying the data compression protocol.

2. The system of claim 1 wherein the first transceiver unit comprises an ADSL transceiver unit.

3. The system of claim 1 wherein the second transceiver unit comprises an ADSL transceiver unit.

4. The system of claim 2 wherein the compression negotiation takes place in an ADSL overhead control channel.

5. The system of claim 2 wherein the compression negotiation takes place in an embedded operations channel.

6. The system of claim 3 wherein the compression negotiation takes place in an ADSL overhead control channel.

7. The system of claim 3 wherein the compression negotiation takes place in an embedded operations channel.

8. The system of claim 1 wherein the communication path comprises a twisted-pair cable.

9. The system of claim 1 wherein the upper and the lower communication layers comprise Open Systems Interconnection layers that handle data transport issues.

10. A method for data communication, the method comprising:
  a. initializing a first transceiver unit and a second transceiver unit;
  b. communicating from the first transceiver unit to the second transceiver unit a request for compression negotiation;
  c. identifying a common compression protocol by:
    accessing a list identifying one or more compression protocols;
    proposing a compression protocol from the list to the second transceiver unit; and
    repeating proposing a compression protocol until the second transceiver unit communicates a positive acknowledgement, the positive acknowledgement identifying the common compression protocol; and
  d. transmitting data compressed using the common compression protocol, wherein the compressed data comprises control information associated with an upper communication layer and compressed control information associated with a lower communication layer.

11. The method of claim 10 wherein the step of identifying further comprises:
  a. repeating the step of proposing until the list is exhausted; and
  b. transmitting uncompressed data.

12. The method of claim 10 wherein the list is prioritized such that the most common compression protocol is at the top of the list and the least common compression protocol is at the bottom of the list.

13. The method of claim 10 wherein the list is prioritized such that the most effective compression protocol is at the top of the list and the least effective compression protocol is at the bottom of the list.

14. The method of claim 10 wherein the step of communicating comprises:
  a. receiving a negative acknowledgement from the second transceiver unit; and
  b. transmitting uncompressed data.

15. The method of claim 10 wherein the step of communicating further comprises:
  a. receiving no response from the second transceiver unit; and
  b. transmitting uncompressed data.

16. The method of claim 10 wherein the first transceiver unit comprises an ADSL transceiver unit.

17. The method of claim 10 wherein the second transceiver unit comprises an ADSL transceiver unit.

18. The method of claim 10 wherein the upper and the lower communication layers comprise Open Systems Interconnection layers that handle data transport issues.

19. A method for data communication, the method comprising:
  a. initializing a first ADSL transceiver unit and a second ADSL transceiver unit;
  b. communicating from the first ADSL transceiver unit to the second ADSL transceiver unit a request for compression negotiation;
  c. accessing a list identifying one or more compression protocols;
  d. proposing a compression protocol from the list by the first ADSL transceiver unit to the second ADSL transceiver unit; and
  e. repeating the step of proposing until the second ADSL transceiver unit communicates a positive acknowledgement to the first ADSL transceiver unit, wherein the positive acknowledgement identifies the common compression protocol; and
  f. transmitting data compressed using the common compression protocol, wherein the compressed data comprises compressed control information, wherein the compressed control information is associated with an upper layer and a lower layer of the Open Systems Interconnection layers that handle data transport issues.

20. Logic for data communication encoded on a media and operable to:
  initialize a first transceiver unit and a second transceiver unit;
  communicate from the first transceiver unit to the second transceiver unit a request for compression negotiation;
  identify a common compression protocol by:
    accessing a list identifying one or more compression protocols;
    proposing a compression protocol from the list to the second transceiver unit; and
    repeating proposing a compression protocol until the second transceiver unit communicates a positive acknowledgement, the positive acknowledgement identifying the common compression protocol; and
  transmit data compressed using the common compression protocol, wherein the compressed data comprises control information associated with an upper communication layer and compressed control information associated with a lower communication layer.

21. The logic of claim 20, wherein the logic is operable to identify the common compression protocol by:
  repeating proposing until the list is exhausted; and
  transmitting uncompressed data.

22. The logic of claim 20, wherein the list is prioritized such that a most common compression protocol is at the top of the list and a least common compression protocol is at the bottom of the list.

23. The logic of claim 20, wherein the list is prioritized such that a most effective compression protocol is at the top of the list and a least effective compression protocol is at the bottom of the list.

24. The logic of claim 20, wherein the logic is operable to communicate by:
  receiving a negative acknowledgement from the second transceiver unit; and
  transmitting uncompressed data.

25. The logic of claim 20, wherein the logic is operable to communicate by:
  receiving no response from the second transceiver unit; and
  transmitting uncompressed data.

26. The logic of claim 20, wherein the first transceiver unit comprises an ADSL transceiver unit.

27. The logic of claim 20, wherein the second transceiver unit comprises an ADSL transceiver unit.

28. The logic of claim 20, wherein the upper and the lower communication layers comprise Open Systems Interconnection layers that handle data transport issues.

29. A system for data communication, the system comprising:
  means for initializing a first transceiver unit and a second transceiver unit;
  means for communicating from the first transceiver unit to the second transceiver unit a request for compression negotiation;
  means for identifying a common compression protocol by:
    accessing a list identifying one or more compression protocols;
    proposing a compression protocol from the list to the second transceiver unit; and
    repeating proposing a compression protocol until the second transceiver unit communicates a positive acknowledgement, the positive acknowledgement identifying the common compression protocol; and
  means for transmitting data compressed using the common compression protocol, wherein the compressed data comprises control information associated with an upper communication layer and compressed control information associated with a lower communication layer.

30. The system of claim 29, wherein the means for identifying further comprises:
  means for repeating proposing until the list is exhausted; and
  means for transmitting uncompressed data.

31. The system of claim 29, wherein the list is prioritized such that a most common compression protocol is at the top of the list and a least common compression protocol is at the bottom of the list.

32. The system of claim 29, wherein the list is prioritized such that a most effective compression protocol is at the top of the list and a least effective compression protocol is at the bottom of the list.

33. The system of claim 29, further comprising means for communicating comprising:
  means for receiving a negative acknowledgement from the second transceiver unit; and
  means for transmitting uncompressed data.

34. The system of claim 29, further comprising means for communicating comprising:
  means for receiving no response from the second transceiver unit; and
  means for transmitting uncompressed data.

35. The system of claim 29, wherein the first transceiver unit comprises an ADSL transceiver unit.

36. The system of claim 29, wherein the second transceiver unit comprises an ADSL transceiver unit.

37. The system of claim 29, wherein the upper and the lower communication layers comprise Open Systems Interconnection layers that handle data transport issues.

38. A system for data communication, the system comprising:
  a transceiver unit;
  a splitter coupled to the transceiver unit and a communication path to a remote device and operable to communicate with the transceiver unit, the transceiver unit operable to perform compression negotiation using the communication path with the remote device to identify a data compression protocol for conducting data communication of compressed data, the compressed data comprising control information associated with an upper communication layer and compressed control information associated with a lower communication layer, the data compression protocol identified by:
    accessing a list identifying one or more compression protocols;
    proposing a compression protocol from the list; and
    repeating proposing a compression protocol until a positive acknowledgement is received, the positive acknowledgement identifying the data compression protocol.

39. The system of claim 38, wherein the transceiver unit is operable to identify the common compression protocol by:
  repeating proposing until the list is exhausted; and
  transmitting uncompressed data.

40. The system of claim 38, wherein the list is prioritized such that a most common compression protocol is at the top of the list and a least common compression protocol is at the bottom of the list.

41. The system of claim 38, wherein the list is prioritized such that a most effective compression protocol is at the top of the list and a least effective compression protocol is at the bottom of the list.

42. The system of claim 38, the transceiver unit is operable to communicate by:
  receiving a negative; and
  transmitting uncompressed data.

43. The system of claim 38, the transceiver unit is operable to communicate by:
  receiving no response; and
  transmitting uncompressed data.

44. The system of claim 38, wherein the compression negotiation takes place in an overhead control channel.

45. The system of claim 38, wherein the compression negotiation takes place in an embedded operations channel.

46. The system of claim 38, wherein the upper and the lower communication layers comprise Open Systems Interconnection layers that handle data transport issues.

47. A method for data communication, comprising:
  initializing a first transceiver unit in communication with a second transceiver unit;
  communicating to the second transceiver unit a request for compression negotiation;
  identifying a common compression protocol by:
    accessing a list identifying one or more compression protocols;
    proposing a compression protocol from the list to the second transceiver unit; and repeating proposing a compression protocol until a positive acknowledgement is received, the positive acknowledgement identifying the common compression protocol; and transmitting data compressed using the common compression protocol, wherein the compressed data comprises control information associated with an upper communication layer and compressed control information associated with a lower communication layer.

48. The method of claim 47, wherein identifying the common compression protocol further comprises:

repeating proposing the compression protocol until the list is exhausted; and transmitting uncompressed data.

49. The method of claim 47, wherein the list is prioritized such that a most common compression protocol is at the top of the list and a least common compression protocol is at the bottom of the list.

50. The method of claim 47, wherein the list is prioritized such that a most effective compression protocol is at the top of the list and a least effective compression protocol is at the bottom of the list.

51. The method of claim 47, further comprising:

receiving a negative acknowledgement from the second transceiver unit; and transmitting uncompressed data.

52. The method of claim 47, further comprising:

receiving no response from the second transceiver unit; and transmitting uncompressed data.

* * * * *